United States Patent
Hayashi et al.

(10) Patent No.: US 11,467,620 B1
(45) Date of Patent: Oct. 11, 2022

(54) ARCHITECTURE AND METHODOLOGY FOR TUNING CLOCK PHASES TO MINIMIZE LATENCY IN A SERIAL INTERFACE

(71) Applicant: CADENCE DESIGN SYSTEMS, INC., San Jose, CA (US)

(72) Inventors: Yuhei Hayashi, San Jose, CA (US); Mitchell G. Poplack, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 516 days.

(21) Appl. No.: 16/217,503

(22) Filed: Dec. 12, 2018

(51) Int. Cl.
*G06F 1/08* (2006.01)
*G06F 13/42* (2006.01)
*G06N 20/00* (2019.01)
*G06F 13/40* (2006.01)

(52) U.S. Cl.
CPC ............ *G06F 1/08* (2013.01); *G06F 13/4004* (2013.01); *G06F 13/4291* (2013.01); *G06N 20/00* (2019.01); *G06F 2213/0002* (2013.01)

(58) Field of Classification Search
CPC .................................................. G06F 13/4291
See application file for complete search history.

(56) References Cited

U.S. PATENT DOCUMENTS

| | | | | |
|---|---|---|---|---|
| 8,000,954 | B2 * | 8/2011 | Schalick | G06F 11/261 703/23 |
| 2007/0297552 | A1 * | 12/2007 | Bae | H04L 7/10 375/371 |
| 2011/0264436 | A1 * | 10/2011 | Ni | G06F 11/3652 703/28 |
| 2016/0147281 | A1 * | 5/2016 | Ware | G11C 7/1066 713/320 |
| 2018/0123775 | A1 * | 5/2018 | Suzuki | H04L 7/046 |

OTHER PUBLICATIONS

Microsoft Press. 2002. Microsoft Computer Dictionary, Fifth Edition (5th. ed.). Microsoft Press, USA. (Year: 2002).*

* cited by examiner

*Primary Examiner* — Kim Huynh
*Assistant Examiner* — Joshua Neveln
(74) *Attorney, Agent, or Firm* — Foley & Lardner LLP (57) ABSTRACT

Embodiments disclosed herein describe systems and methods for tuning phases of interface clocks of ASICs in an emulation system for a low latency channel and to avoid read errors. During a bring-up time (e.g., powering up) of the emulation system, one or more training processors may execute a software application to iteratively tune the phases of the interface clocks such that data is written to the interface buffers prior to being read out. To mitigate the problem of higher latency, the training processors may execute software application to tune the clock phases such that there is a small time lag between the writes and reads. The training processors may set the time lag to account for factors such as memory setup and hold, clock skews, clock jitters, and the predicted margin required to account for future clock drift due to carrying operating conditions.

20 Claims, 9 Drawing Sheets

ARCHITECTURE AND METHODOLOGY FOR TUNING CLOCK PHASES TO MINIMIZE LATENCY IN A SERIAL INTERFACE

TECHNICAL FIELD

This application is generally directed towards processor based emulation systems and specifically towards architecture and methodology for tuning clock phases to minimize latency in serial interfaces of processor based emulation systems.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for synthesis, debugging, and functional verification of the ICs. A significant function of EDA tools is emulation of a user's logical system (e.g., an IC design) to perform pre-silicon functional verification, firmware and software development, and post-silicon debug. To achieve this, a typical processor-based emulation system comprises several Application Specific Integrated Circuits (ASICs), often referred to as emulation ASICs or emulation chips, all working together to execute a program generated by an emulation compiler generated from the user's IC design. The compiled program models a design under test (DUT) that is a logical representation of the user's IC design running on the several emulation ASICs of the emulation system.

Emulation ASICs may communicate with each other communication links such as copper traces carrying data in a circuit board or optical cables carrying data across circuit boards. The communication links often carry serialized data although the data may be generated and/or consumed in parallel. Therefore, an input/output (I/O) interface at a transmit side may serialize parallel data prior to transmission and another I/O interface at a receive side may parallelize received serial data.

The I/O interfaces at the transmit side and/or the receive side may use a different clock than the processing core that generates or consumes the data. For example, at the transmit side, the processing core may use a processing core clock to generate and write the output data to a buffer to the transmit I/O interface, which then has to be transmitted by the I/O interface using a transmit clock. The processing core clock and the transmit clock may have different frequencies and there may be a mismatch in phases generating read errors or higher latency. Read errors may occur when a read operation is performed before the data is written into the buffer. Higher latency may be caused by the data being stored in the buffer for a longer duration of time before being read out.

SUMMARY

What is therefore desired are systems and methods that tune clock phases of one or more interface clocks in reference in the processing core clock to minimize latency and avoid read errors.

Embodiments disclosed herein solve the aforementioned technical problems and may provide other technical benefits as well. During a power-up (also referred to as bring-up) phase of an emulation system, one or more processors (e.g., a training processor) executing a training software may tune corresponding phases of interface clocks of a chip in reference to the phase of the processing core clock of the chip. The interface clocks may drive the corresponding interfaces, which may include transmit interfaces that may transmit data generated by the processing core and receive interfaces that may receive data consumed by the processing core. Within a single chip, the interface clocks may have different frequencies based on the speed of the data lanes supported by the corresponding interfaces. One or more training processors may tune the interface clocks to have corresponding predetermined phase differences with the processing core clock.

In operation, the processing core of the chip may write a training data from the processing core clock domain to a transmit buffer in a transmit interface. A read logic in the transmit interface may read from the transmit buffer the training data from the transmit clock domain. If the read logic indicates an unstable reading of the training data to the training processor, the training processor instructs a corresponding clock signal generator to shift the phase of the transmit clock. The training processor may repeat the cycle of writing the training data from the processing core clock domain, reading the training data from the transmit clock domain, determining the status of the read, and instructing the corresponding clock signal generator to shift the phase of the transmit clock until the read logic indicates a stable reading of the training data. The training processor may continue to instruct the clock signal generator to shift the phase even if the read logic indicates a stable reading of the training data to determine a window of phases of the transmit clock where the read logic can have a stable reading of the training data. Within the window, the training processor may set a phase for the transmit clock with a phase difference from the processing core clock to account for factors such as hold and setup time of transmit buffer, clock jitter and skew of the processing core clock and/or the transmit clock, and/or the predicted margin required to account for future clock drift due to operating conditions of the emulation system.

In an embodiment, method of tuning clock phases in a transmit interface of a chip in an emulation system comprises writing, by a core component of a chip in an emulation system, a training data packet from a core clock domain associated with a core clock signal to a hardware buffer in a transmit interface of the chip; reading, by a read logic in the transmit interface from the hardware buffer, the training data packet to a transmit clock domain associated with a transmit clock signal; and in response to a training processor determining an unstable reading of the training data packet; instructing, by the training processor, a clocking logic in the transmit interface to shift the phase of the transmit clock signal.

In another embodiment, an emulation system comprises a chip comprising: a core component configured to write a training data packet from a core clock domain associated with a core clock signal to a hardware buffer in a transmit interface; a read logic in the transmit interface configured to read the training data packet from the hardware buffer to a transmit clock domain associated with a transmit clock signal; and a training processor configured to: instruct a clocking logic in the transmit interface to shift the phase of the transmit clock signal in response to the training processor determining an unstable reading of the training data packet.

In yet another embodiment, a method of tuning clock phases in a receive interface of a chip in an emulation system comprises writing, by a circuit in an emulation system, a training data packet from a receive clock domain associated with a receive clock signal to a hardware buffer in a receive interface of a chip; reading, by a read logic in the receive interface from the hardware buffer, the training data packet to a core clock domain associated with a core clock signal of a processing core of the chip; and in response to a training processor determining an unstable reading of the training data packet: instructing, by the training processor, a clocking logic in the receive interface to shift the phase of the receive clock signal.

BRIEF DESCRIPTION OF THE DRAWINGS

The accompanying drawings constitute a part of this specification and illustrate an embodiment of the subject matter described herein.

DETAILED DESCRIPTION

Embodiments disclosed herein describe systems and methods for tuning phases of interface clocks of ASICs in an emulation system for a low latency throughput and to avoid read errors. During a bring-up time (e.g., powering up) of the emulation system, one or more training processors may execute a software application to iteratively tune the phases of the interface clocks such that data is written to the interface buffers prior to being read out. To mitigate the problem of higher latency, the training processors may execute software application to tune the clock phases such that there is a small time lag between the writes and reads. The training processors may set the time lag to account for factors such as memory setup and hold, clock skews, and/or clock jitters. Based on the training, the emulation system may provide a low latency throughput and also accommodate for distortions of clock skews and jitters as the conditions of the emulation system, such as the temperature, vary during runtime. The time lag may accommodate for a predicted margin required for future clock drifts due to the operating conditions of the emulation system.

The emulation system may include emulation ASICs (or emulation chips) that may contain a plurality of Boolean processors emulating different functions of a DUT. The emulation system may further include switching ASICs (or switching chips) that may switch and route data between the emulation ASICs. The data between the emulation ASICs and/or the switching ASICs may move through serializer-deserializer (SerDes) lanes. Each of the emulation ASICs and switching ASICs may have SerDes transmit interface that may serialize parallel data generated from the processing core of the ASIC and a SerDes receive interface that may parallelize received serial data and provide it to the processing core of the ASIC. Therefore, each of the SerDes interfaces may include a serial interface that parallelizes received serial data at the receive side and serializes parallel data to be transmitted at the transmit side. A SerDes transmit interface may have a transmit buffer that the processing core writes the data to be transmitted. Additionally, a SerDes receive interface may have a receive buffer that the processing core may read the received data. The systems and methods described herein minimize the latency of the data by minimize the time the data is stored in one or more of the aforementioned buffers. Furthermore, the systems and methods described herein avoid read errors by configuring a read operation to occur after a write operation.

One or more operations are described herein as being implemented by a training processor. The training processor may be any processor or a portion thereof in the emulation system. For example, the training processor may be a processor that implements one or more bring-up operations when the emulation system is started. As another example, the training processors may be a combination of one or more controllers within the SerDes transmit/receive interfaces or the processing core of the ASICs (e.g., emulation ASIC or switching ASIC) in the emulation system. The training processor may also be a compile processor that compiles and downloads one or more instructions to the emulation system to emulate a DUT. Regardless of the configuration of the training processor, the training processor may implement one or more training software modules to tune the phases of interface clocks of one or more of the SerDes transmit/receive interfaces as described in the embodiments disclosed herein.

Figure 1:
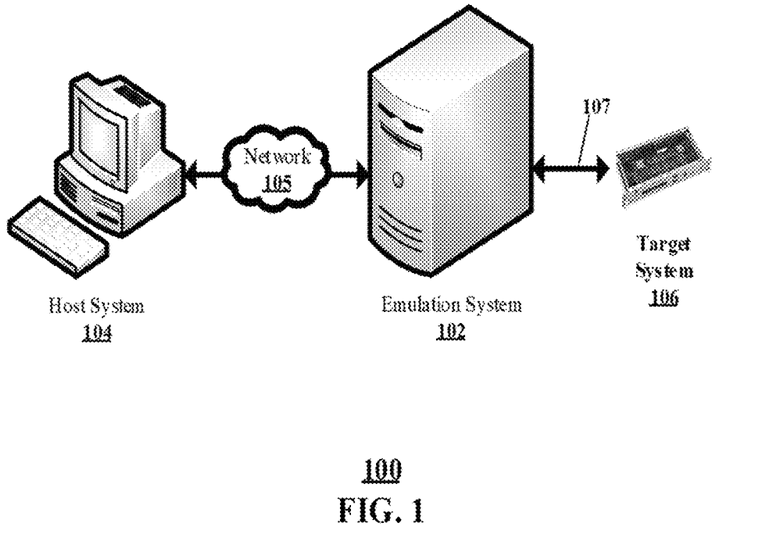
FIG. 1 shows an illustrative environment including an emulation system, according to an embodiment.

FIG. 1 shows an illustrative environment 100 of an emulation system that may tune clock phases of interface clocks for a low latency throughput in a serial interface while avoiding read errors. The illustrative environment 100 may comprise a host system 104, an emulation system 102, a target system 106, a network 105, and a connection 107. The host system 104 may include one or more workstations that may run debug and runtime software interacting with the emulation system 102. The workstations may be any type of computing devices such as desktop computers, laptop computers, tablet computers, and smartphones. The emulation system 102 may a combination of hardware and software modules which may emulate a design under test (DUT). The emulation system 102 may include clusters of interconnected ASICs, non-transitory memory devices, buffers, data storage devices configured to provide a system platform for emulating the DUT. The clusters may be arranged in multiple boards. The boards may be arranged within multiple racks. Multiple racks may be arranged in a plurality of emulation of devices, which may be analogous to multi-rack servers. The target system 106 may comprise hardware and/or software modules configured to interact with the DUT being emulated. For example, if the DUT is a design of a graphics processing unit (GPU), the target system 106 may be a motherboard configured to receive the GPU after fabrication. The target system 106 may be an external hardware environment provided by the user.

The network 105 may be any kind of communication link facilitating communication between the host system 104 and the emulation system 102. For example, the network 105 may a local area network may include a local area network (LAN), metropolitan area network (MAN), wide area network (WAN), and/or the Internet. The connection 107 may be also be any kind of communication link configured to facilitate a communication with the emulation system 102 and the target system 106.

The above described systems 102, 104, 106 of the environment 100 are merely illustrative and other configuration should be considered to be within the scope of this disclosure. For example, the network 105 may include a local connection 107 or a combination of multiple local interconnects. In some embodiments, the systems 102, 104, 106 may be local and housed within the same building. In other embodiments, one or more of the systems 102, 104, 106 may be accessed remotely. For example, the host system 104 may remotely access the emulation system 102 through the network 104 using a remote access protocol such as internet protocol (IP).

Figure 2:
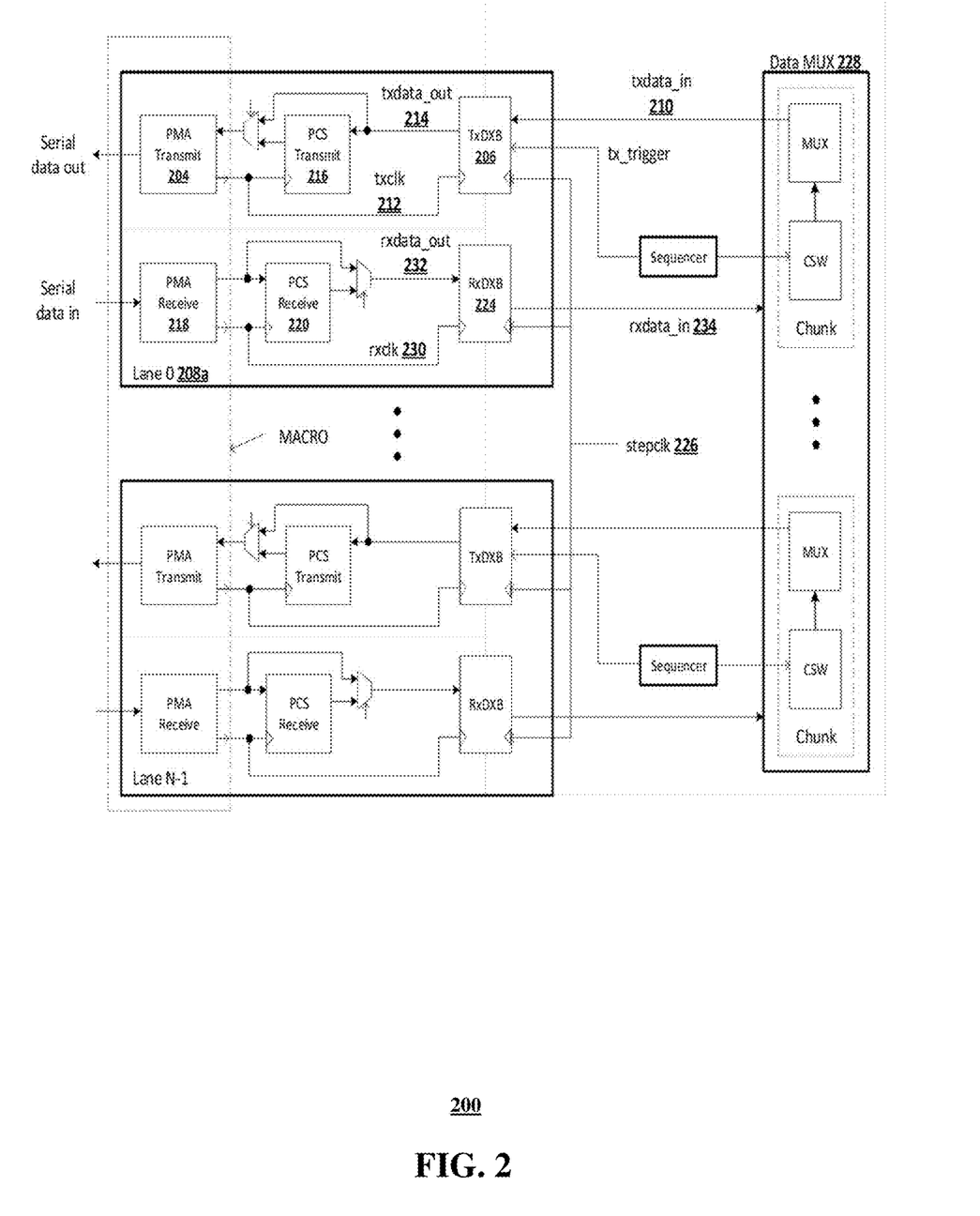
FIG. 2 shows an illustrative serializer-deserializer interface, according to an embodiment.

FIG. 2 shows an illustrative SerDes interface 200, according to an exemplary embodiment. The SerDes interface 200 may be in an emulation ASIC of an emulation system or at a switching ASIC of the emulation system. The SerDes interface 200 may have multiple data lanes (e.g., N lanes from lane 0 to lane N−1), out of which a first lane 208*a* (lane 0, as shown) has been labeled for reference. It should be understood that the description of the first lane 208*a* may apply the other lanes as well. However, it should be understood that the lanes may operate at different clock speeds. For example, lane 0 may be faster than lane N−1.

The first lane 208*a* in the SerDes interface 200 may include a transmit portion containing a physical media attachment transmit (PMA TX) macro 204 (also referred to as PMA TX 204), a physical coding sublayer transmit (PCS TX) component 216 (also referred to as PCS TX 216), and a dual port transmitter domain-crossing buffer (TxDXB) 206. The first lane 208*a* may further include a receive portion containing a physical media attachment receive macro (PMX RX) 218 (also referred to as PMA RX 218), a physical coding sublayer receive (PCS TX) component 220 (also referred to as PCS RX 220), and a dual port receiver domain-crossing buffer (RxDXB) 224.

The PMA TX 204 may include multi-link/multi-protocol logic block that may provide clock signal, reset signal, and/or power control signals to the transmit portion of the first lane 208*a* of the SerDes interface 200. For example, the PMA TX 204 may include a phase locked loop (PLL) that may provide txclk signal 212 to the TxDXB 206. The txclk signal 212 may be a clock signal controlling the operation of the transmit portion of the first lane 208*a*. Therefore, the txclk signal 212 may determine the speed of operation of the transmit portion of the first lane 208*a*. For example, the txclk signal 212 may synchronize read operation from the TxDXB 206 which may contain input data txdata_in 210 written into the TxDXB using stepclk signal 226 that may be the clock signal for the processing core (e.g., data multiplexer 228) of the ASIC containing the SerDes interface 200. In an embodiment, the PMA TX 204 may further include a read logic (not shown) that may read txdata_out 214 from the TxDXB 206. In another embodiment, the read logic may be a combination of logic circuits in one or more components of the transmit portion of the first lane 208*a*. The PCS TX 216 may encode txdata_out 214 into a suitable physical channel coding.

The TxDXB 206 may be a dual port hardware memory that may receive input data txdata_in from the stepclk signal 226 domain and provide output data txdata_out 214 in the txclk signal 212 domain. Therefore, TxDXB 206 may receive txdata_in 210 at a clock speed different from the clock speed that reads txdata_out 214. If the phases of the stepclk 226 and the txclk 212 are not tuned, there may either be a read error or a higher latency. A read error may occur when the txclk signal 212 triggers a read operation to read txdata_out 214 from the TxDXB 206 before the stepclk signal 226 triggers a write operation to write the txdata_in 210 to the TxDXB 206. A higher latency may occur when the txclk signal 212 triggers a read operation to read txdata_out 214 from the TxDXB 206 after a time lag from when the stepclk signal 226 triggers a write operation to write txdata_in 210 to TxDXB 206. The embodiments of systems and methods described herein may tune the phase of the txclk signal 212 in reference to the stepclk signal 226 such that there is a low latency between the write operation to the TxDXB 206 and the subsequent read operation from the TxDXB 206.

The PMA RX 218 may include multi-link/multi-protocol logic block that may provide clock signal, reset signal, and/or power control signals to the receive portion of the first lane 208*a* of the SerDes interface 200. For example, the PMA RX 218 may include a phase locked loop (PLL) that may provide rxclk signal 230 to the RxDXB 224. The rxclk signal 230 may be a clock signal controlling the operation of the receive portion of the first lane 208*a*. Therefore, the rxclk signal 230 may determine the speed of operation of the receive portion of the first lane 208*a*. For example, the rxclk signal 230 may synchronize write operation to write input data rxdata_out 232 to the TxDXB 224 that may then be read out as output data rxdata_in 234 by the processing core using the stepclk signal 226. The PCS RX 220 may decode rxdata_out 232 to reverse physical channel coding.

In some embodiments, it may not be desirable to tune the phase of rxclk signal 230 in reference to stepclk signal 226. The data received by the receive side may asynchronous and the processing core may consume the data as it is received. However, in cases where input data may arrive earlier in some lanes than others and the lane delays are known, it may be desirable to compile for performance rather than delay symmetry. For example, the first lane 208*a* (lane 0) may receive data from an emulation cycle (as indicated by a prefix) sooner than lane N−1 receives data from the same emulation system. In this case, data received by the first lane 208*a*, rxdata_out 232, may reside in the RxDXB 224 longer than necessary thereby increasing the latency at the receive side. To improve performance, the processing core may read the rxdata_in 234 from the RxDXB 224 without waiting for the data received by lane N−1. The processing core may read the data from the corresponding RxDXB as the data arrives at lane N−1.

However, in some embodiments, it may be desirable to measure the phase of the rxclk signal 230 during bring up time based on the latency of a connection interfacing the first lane 208*a*. A compiler or scheduler may schedule a transmission of data in the connection based on the latency and the phase of the rxclk signal 230 such that incoming data is written to and read from RxDXB 224 with minimal latency.

Figure 3:
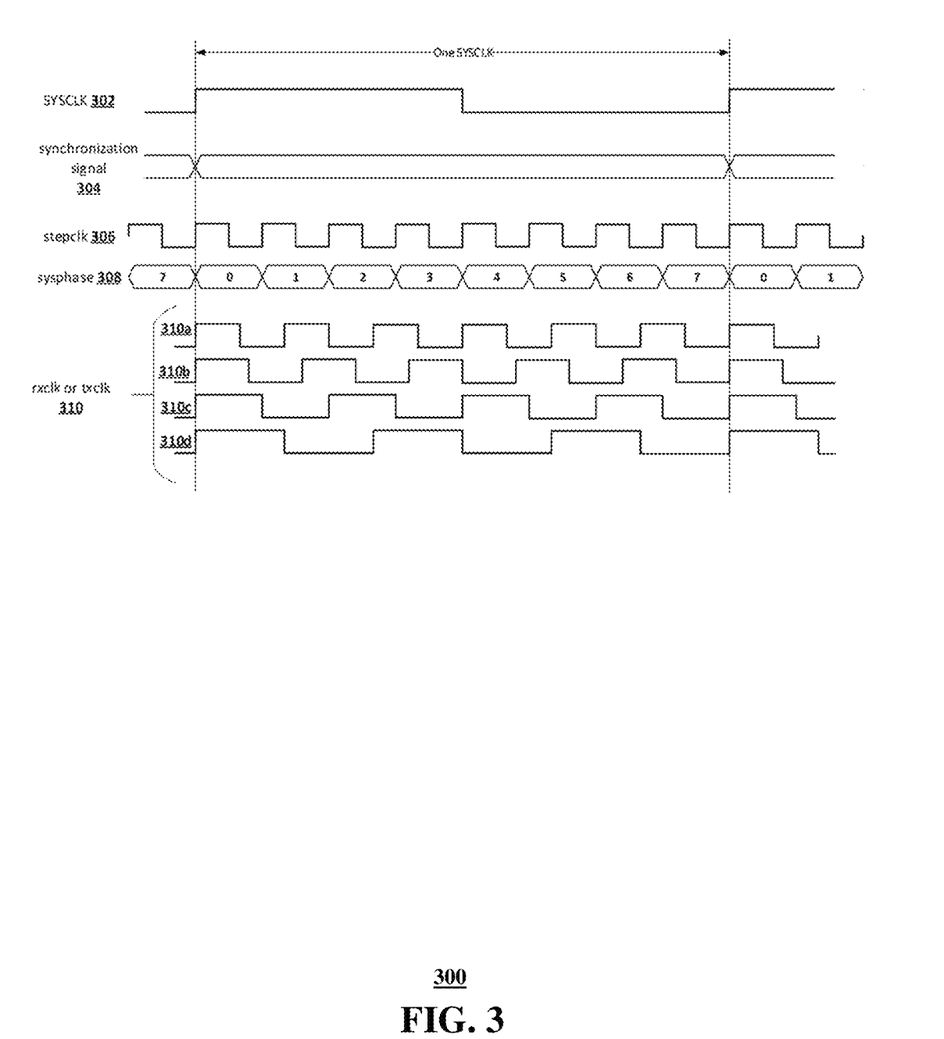
FIG. 3 shows illustrative signals in a processing core and a plurality of interfaces in an ASIC of an emulation system, according to an embodiment.

FIG. 3 shows as illustration 300 of various clock domains in an ASIC (e.g., emulation ASIC or switching ASIC) of an emulation system. A sysclk signal 302 may be the clock signal controlling the entire emulation system. A synchronization signal 304 may provide one or more synchronization functionality in the emulation system. A stepclk signal 306 may be the clock signal of the processing core of the ASIC. The ASIC may generate the stepclk signal 306 from the sysclk signal 302. For example, a phase locked loop (not shown) in the ASIC may receive the sysclk signal 302 as an input and generate the stepclk signal 306 as an output. The stepclk signal 306 may have multiple cycles within a single cycle of the sysclk signal 302. In the example shown in FIG. 3, the stepclk signal 306 has eight cycles within a single cycle of the sysclk signal 302. A sysphase signal 308 may indicate the relationship between the cycle of the stepclk signal 306 and the sysclk signal 302. The logical value of the sysphase signal 308 may indicate the cycle number of the stepclk signal 306 within the sysclk signal 302. For example, within the sysclk signal 302, the sysphase signal 308: (i) 0 may indicate a first cycle of the stepclk signal 306, (ii) 1 may indicate a second cycle of the stepclk signal 306, (iii) 2 may indicate a third cycle of the stepclk signal 306, (iv) 3 may indicate a fourth cycle of the stepclk signal 306, (v) 4 may indicate a fifth cycle of the stepclk signal 306, (vi) 5 may indicate a sixth cycle of the stepclk signal 306, (vii) 6 may indicate a seventh cycle of the stepclk signal 306, and (vii) 7 may indicate a last cycle of the stepclk signal 306.

The SerDes interfaces in the ASIC may generate multiple clock signals such as rxclk/txclk signals 310a-310d (collectively referred to as 310). Each of the rxclk/txclk signals 310 may have different frequencies based on the on the speed of the data lane supported by the respective SerDes interface. Therefore, each of the rxclk/txclk signals 310 may have different number of clock cycles within a single cycle of the sysclk signal 302. As shown, within a single cycle of the sysclk signal 302: (i) rxclk/txclk signal 310a may have six cycles, (ii) rxclk/txclk signal 310b may have five cycles, (iii) rxclk/txclk signal 310c may have four cycles, and (i) rxclk/txclk signal 310d may have three cycles.

Therefore, it should be understood that frequency the core clock signal (e.g., stepclk signal 306) may be different from frequencies of the interface clock signals (e.g., rxclk/txclk signals 310). Furthermore, the phases of the rxclk/txclk signals 310 may not necessarily match the phase of the stepclk signal 306. The illustrative embodiments in the disclosure are directed to matching the phases of the rxclk/txclk signals 310 in reference to the phase of stepclk signal 306.

Figure 4:
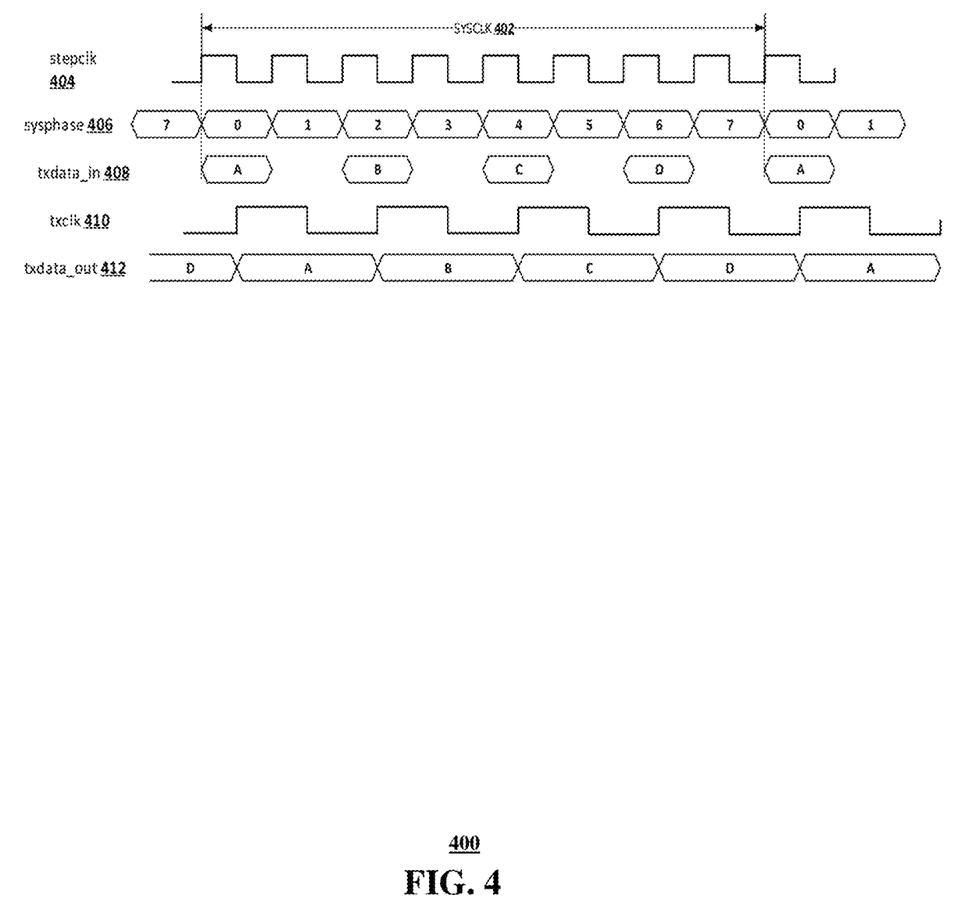
FIG. 4 shows illustrative signals in a processing core and a transmit interface in an ASIC of an emulation system, according to an embodiment.

FIG. 4 shows illustrative signals 400 in an ASIC associated with generating and transmitting data packets. The illustrative signals 400 may be associated with a 10X transmission mode where the transmission of data is ten times faster than the cycle of the stepclk signal 404. The serialization factor may be twenty and therefore a data packet (e.g., data packets A, B, C, and D) may be twenty bits long. Half of steps (four out of eight) of the stepclk signal 404 may provide data packets to be transmitted. Because twenty bits are transmitted four times in each sysclk cycle, this results in eighty bits every sysclk, or ten times the stepclk rate. As shown, the in the datastream txdata_in 408 that written by the core to a transmit buffer, the core may generate: (i) data packet A at logical value 0 of sysphase signal 406, (ii) data packet B at logical value 2 of sysphase signal 406, (iii) data packet C at logical value 4 of sysphase signal 406, and (iv) data packet D at logical value 6 of sysphase signal 406. From the transmit buffer, a next triggering edge of txclk signal 410 (transmit clock signal) may transmit a stored packet out of the ASIC. As shown, the txclk signal 410 may trigger the transmission of the data packets stored in the transmit buffer to generate the output datastream txdata_out 412 as follows: (i) data packet A is transmitted at a triggering edge of txclk signal 410 at logical state 0 of the sysphase signal 406, (i) data packet A is transmitted at a triggering edge of txclk signal 410 at logical state 0 of the sysphase signal 406, (ii) data packet B is transmitted at a triggering edge of txclk signal 410 at logical state 2 of the sysphase signal 406, (iii) data packet C is transmitted at a triggering edge of txclk signal 410 at logical state 4 of the sysphase signal 406, and (iv) data packet D is transmitted at a triggering edge of txclk signal 410 at logical state 6 of the sysphase signal 406. It should be understood that FIG. 4 illustrates the interface to the SerDes PMA, so the serialization of the data within each word of txdata_out is not illustrated.

It should also be understood that there may have to be a phase match between the stepclk signal 404 and the txclk signal 410 such that data packets are read from the transmit buffer after the data packets have been written into the transmit buffer. Therefore, the triggering edge of the txclk signal 410 that reads a stored data packet in the transmit buffer may have to occur after the triggering edge of the stepclk signal 404 that writes the data packet in the transmit buffer. If the phases are not tuned, the read triggering edge of the txclk signal 410 may occur before the write triggering edge of the stepclk 404 signal generating a read error. Alternatively, there may be a time lag between the write triggering edge of the stepclk signal 404 and the read triggering edge of the txclk signal 410 in which the data although ready to be read stays stored in the transmit buffer thereby increasing the latency of transmission.

In an ideal situation, there may be no time lag between the write triggering edge of the core clock signal (e.g., stepclk signal 404) and the read triggering edge of the transmit clock signal (e.g., txclk signal 410). In reality, there may be other factors that the emulation system may have to account for when tuning the phase of the transmit clock signal. For example, the transmit buffer may have a setup and hold time and there may be clock uncertainties such as clock jitters and clock skews and the relationship between clocks may drift as the operating conditions of the system (such as the temperature) vary. The clock uncertainties may be within a predicted margin that the tuned phases may accommodate.

Figure 5:
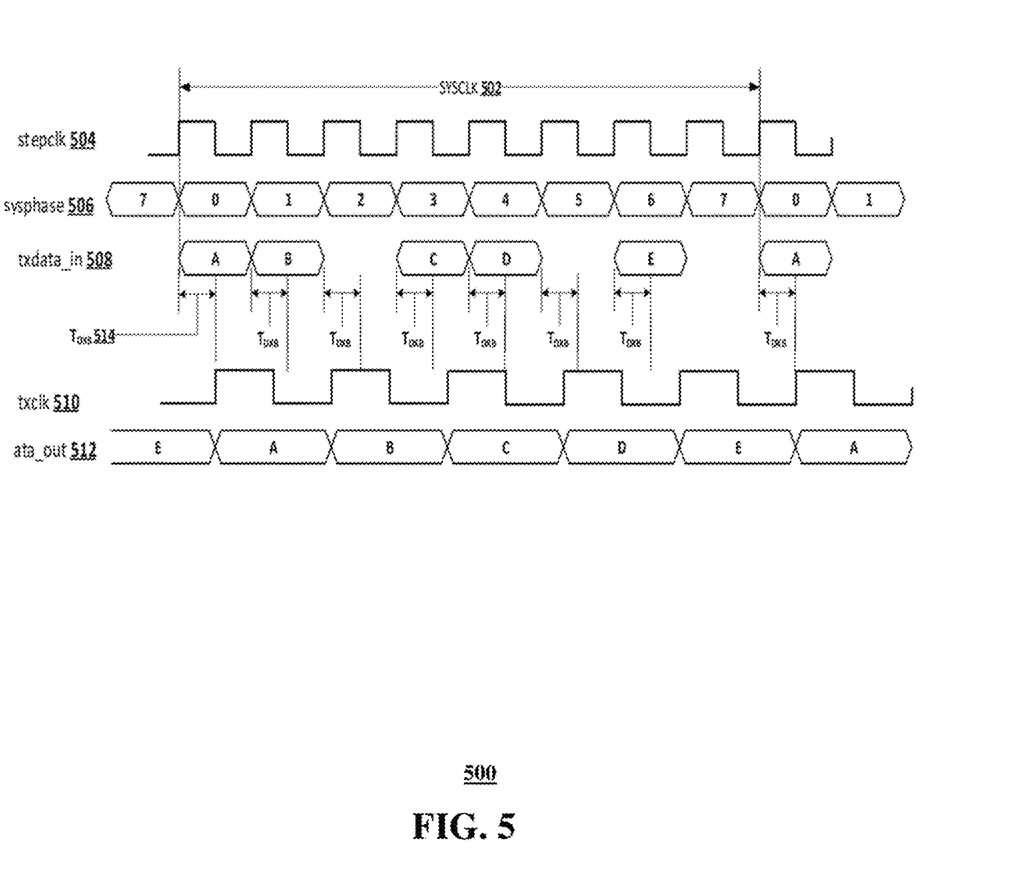
FIG. 5 shows illustrative signals in a processing core and a transmit interface in an ASIC of an emulation system, according to an embodiment.

FIG. 5 shows illustrative signals 500 in an ASIC, wherein the phase of a core clock signal is aligned with phase of the transmit clock signal accounting for clock skews, uncertainties, and/or drifts. The illustrative signals 500 may be associated with a 15X transmission mode where the transmission of data is fifteen times faster than the cycle of the stepclk signal 504. The serialization factor may be twenty and therefore a data packet (e.g., data packets A, B, C, D, and E) may be twenty bits long. Five steps out of eight steps stepclk signal 504 may provide data packets to be transmitted. As shown, the in the datastream txdata_in 508 that written by the core to a transmit buffer, the core may generate: (i) data packet A at logical value 0 of sysphase signal 506, (ii) data packet B at logical value 1 of sysphase signal 506, (iii) data packet C at logical value 3 of sysphase signal 506, (iv) data packet D at logical value 4 of sysphase signal 506, and (v) data packet E at logical value 6 of sysphase signal 506.

To account for hold and setup time of the transmit buffer and clock skews, uncertainties, and/or drifts of one or more of the stepclk signal 504 and the txclk signal 510, a processor may be tuned to realize a delay of $T_{DXB}$ 514. Therefore, the reading edge of the txclk 510 may occur after the delay of $T_{DXB}$ 514 from the writing edge of the stepclk signal 504.

Figure 6:
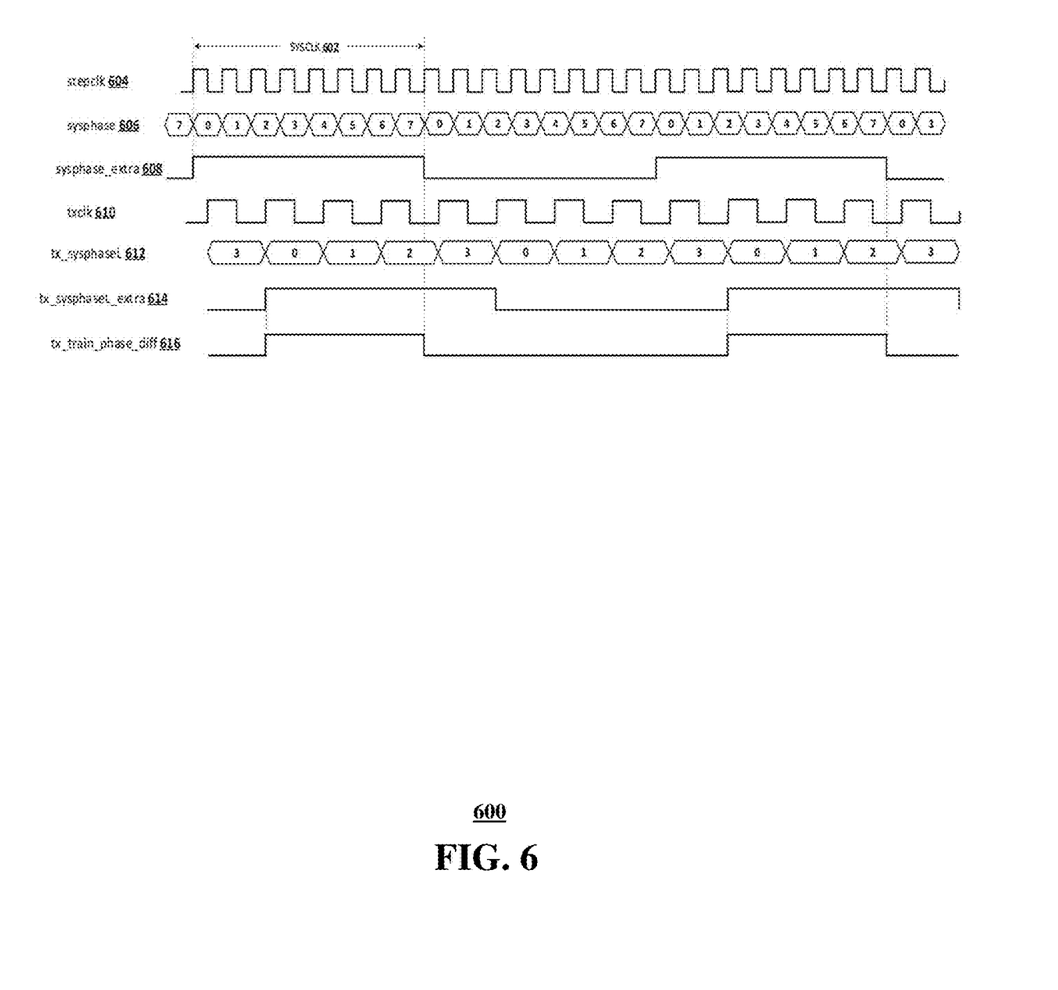
FIG. 6 shows illustrative signals in a processing core and a transmit interface in an ASIC of an emulation system, according to an embodiment.

FIG. 6 shows illustrative signals 600 in an ASIC associated with a phase delay setting generated from tuning interface clocks. A sysclk signal 602 may be the clock signal controlling the entire emulation system. A stepclk signal 604 may be the clock signal controlling the core of the ASIC. The ASIC may generate the stepclk signal 604 from the sysclk signal 602. For example, a phase locked loop (not shown) in the ASIC may receive the sysclk signal 602 as an input and generate the stepclk signal 604 as an output. The stepclk signal 604 may have multiple cycles within a single cycle of the sysclk signal 602. In the example described herein, the stepclk signal 604 has eight cycles within a single cycle of the sysclk signal 602. A sysphase signal 606 may indicate the relationship between the cycle of the stepclk signal 604 and the sysclk signal 602. The logical value of the sysphase signal 606 may indicate the cycle number of the stepclk signal 604 within the sysclk signal 602. For example, a logical value 4 of the sysphase signal 606 may indicate the fifth cycle of the stepclk signal 604 within the sysclk signal 602.

A sysphase_extra signal 608 may be based upon the sysclk signal 604. More particularly, the sysphase_extra signal 608 may have half the frequency of the sysclk signal 604. As shown, the sysphase_extra signal 608 may have a logical value of 1 during a first cycle of the sysclk signal 602 or the first eight cycles of the stepclk signal 604. A txclk signal 610 may be the clock signal driving the transmission interface of the ASIC. As shown, the txclk signal 610 may have four cycles within a single cycle of the sysclk signal 602 or within eight cycles of the stepclk signal 604. A tx_sysphaseL signal 612 may indicate a cycle number of the txclk signal 610 within the single cycle of the sysclk signal 602 or within eight cycles of the stepclk signal 604. As shown, tuning of the txclk signal 610 has introduced a delay between the first cycle of the stepclk 604 and the first cycle of the txclk 610. A signal tx_sysphaseL_extra signal 614 may have the same frequency as the sysphase_extra signal 608 but with the delay introduced by the phase tuning. Therefore, the delay between the sysphase_extra signal 608 and the tx_sysphaseL_extra signal 614 may be the same as the delay between the first cycle of the stepclk signal 604 (where the logical value of the sysphase signal 606 is 0) and the first cycle of the txclk signal 610 (where the logical value of the tx_sysphaseL 612 is 0).

A circuit in the emulation system may generate a reference signal, tx_train_phase_diff signal 616, by performing an AND operation on the tx_sysphaseL_extra signal 614 and sysphase_extra signal 608. A training processor may measure the duty cycle of the tx_train_phase_diff signal 616 by sampling multiple times using a clock signal (not shown) that is asynchronous to the sysclk 602 and counting the likelihood of a 1 value versus a 0 value. As described herein, the goal of tuning the phase of the txclk 610 may be to maximize the duty cycle of tx_train_phase_diff signal 616 while keeping the validity of the read operations (e.g., data is written before it is read). By maximizing the duty cycle, the processor may minimize the latency of the write-read operations in a buffer of the interface. The final delay setting for the txclk signal 610 may be the last working delay (e.g., which avoids a read error) and some margin for setup and hold times, clock skews, clock jitters, and/or clock drifts.

Figure 7:
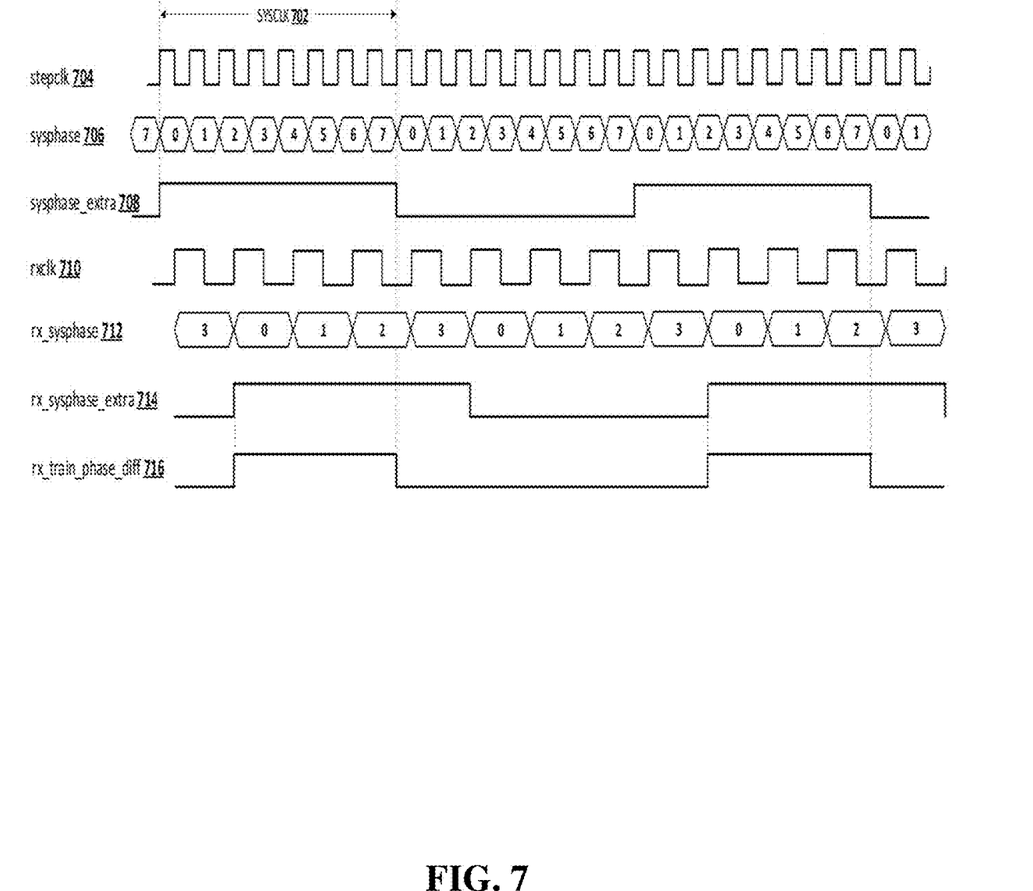
FIG. 7 shows illustrative signals in a processing core and a receive interface in an ASIC of an emulation system, according to an embodiment.

FIG. 7 shows illustrative signals 700 at a receive interface of an ASIC in an emulation system, according to an embodiment. A sysclk signal 702 may be the clock signal controlling the entire emulation system. A stepclk signal 704 may be the clock signal controlling the core of the ASIC. The ASIC may generate the stepclk signal 704 from the sysclk signal 702. For example, a phase locked loop (not shown) in the ASIC may receive the sysclk signal 702 as an input and generate the stepclk signal 704 as an output. The stepclk signal 704 may have multiple cycles within a single cycle of the sysclk signal 702. In the example described herein, the stepclk signal 704 has eight cycles within a single cycle of the sysclk signal 702. A sysphase signal 706 may indicate the relationship between the cycle of the stepclk signal 704 and the sysclk signal 702. The logical value of the sysphase signal 706 may indicate the cycle number of the stepclk signal 704 within the sysclk signal 702. For example, logical value 4 of the sysphase signal 706 may indicate the fifth cycle of the stepclk signal 704 within the sysclk signal 702.

A sysphase_extra signal 708 may be based upon the sysclk signal 704. More particularly, the sysphase_extra signal 708 may have half the frequency of the sysclk signal 704. As shown, the sysphase_extra signal 708 may have a logical value of 1 during a first cycle of the sysclk signal 702 or the first eight cycles of the stepclk signal 704. An rxclk signal 710 may be the clock signal driving the receive interface of the ASIC. As shown, the rxclk signal 710 may have four cycles within a single cycle of the sysclk signal 702 or within eight cycles of the stepclk signal 704. An rx_sysphase signal 712 may indicate a cycle number of the rxclk signal 710 within the single cycle of the sysclk signal 702 or within eight cycles of the stepclk signal 704. As shown, tuning of the rxclk signal 710 has introduced a delay between the first cycle of the stepclk 704 and the first cycle of the rxclk 710. A signal rx_sysphase_extra signal 714 may have the same frequency as the sysphase_extra signal 708 but with the delay introduced by the phase tuning. Therefore, the delay between the sysphase_extra signal 708 and the rx_sysphase_extra signal 714 may be the same as the delay between the first cycle of the stepclk signal 704 (where the logical value of the sysphase signal 706 is 0) and the first cycle of the rxclk signal 710 (where the logical value of the rx_sysphase 712 is 0).

A circuit in the emulation system may generate a reference signal, rx_train_phase_diff signal 716, by performing an AND operation on the rx_sysphase_extra signal 714 and sysphase_extra signal 708. The training processor may measure the duty cycle of the rx_train_phase_diff signal 716 by sampling multiple times using a clock signal (not shown) that is asynchronous to the sysclk 702 and counting the likelihood of a 1 value versus a 0 value. As described herein, the goal of tuning the phase of the rxclk 710 may be to maximize the duty cycle of rx_train_phase_diff signal 716 while keeping the validity of the read operations (e.g., data is written before it is read). The duty cycle may be an indication of a pointer difference the read and write sides. By maximizing the duty cycle, the processor may minimize the latency of the write-read operations in a buffer of the receive interface. The final delay setting for the rxclk signal 710 may be the last working delay (e.g., which avoids a read error) and some margin for setup and hold times, clock skews, clock jitters, and/or clock drifts.

Figure 8:
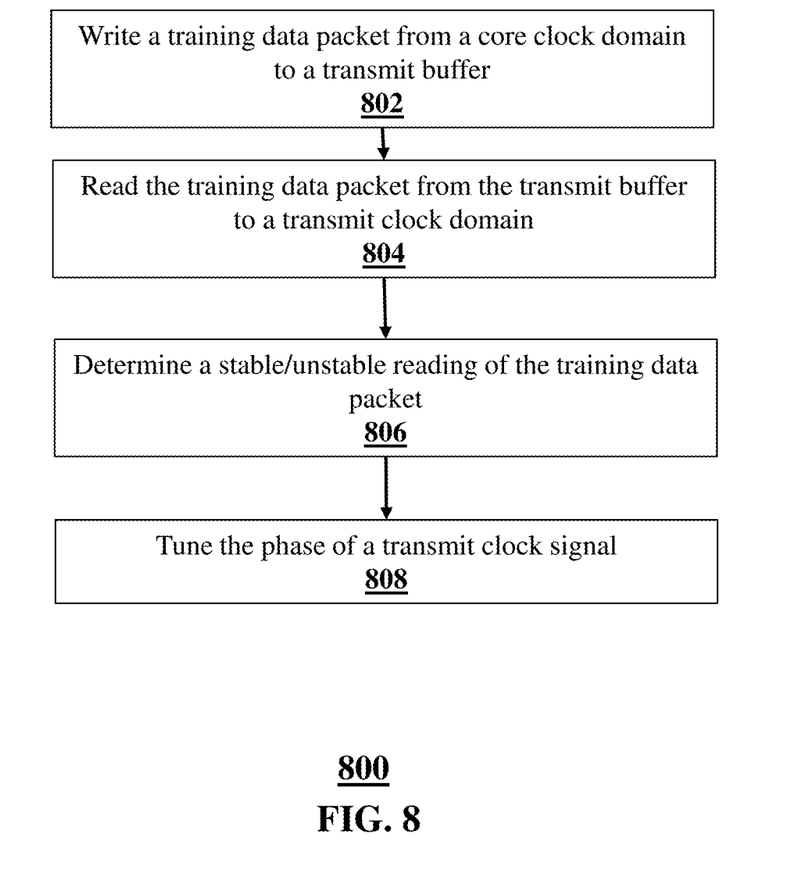
FIG. 8 shows a flow diagram of an illustrative method of tuning an interface clock of a transmit interface in an ASIC of an emulation system, according to an embodiment.

FIG. 8 shows a flow diagram of an illustrative method 800 for tuning phases of a transmit interface clock in a chip in an emulation system, according to an embodiment. It should be understood that the steps of the method 800 are merely illustrative and additional/alternative steps should be considered within the scope of this disclosure. Furthermore, one or more steps of the method 800 may be skipped altogether.

The method 800 may begin at step 802 where a processing core of a chip may write a training data packet from a core clock domain to a transmit buffer. The transmit buffer may be a part of a SerDes transmit interface.

At step 804, a read logic may read the training data packet from the transmit buffer to a transmit clock domain. The read logic may be a part of the SerDes transmit interface. For example, the read logic may be a portion of a physical media attachment macro in the transmit interface.

At step 806, a training processor may determine a stable/unstable reading of the training data packet. For a stable reading of the training data packet, the training processor may receive an indication from the read logic that the entirety of the training data packet was read. The training processor may further receive an indication that valid error correcting bits were read by the read logic. For an unstable reading of the training data packet, the training processor may receive an indication that the entirety of the training data packet could not be read by the read logic. Additionally or alternatively, the training processor may receive an indication that a validity check based upon the error correcting bits failed.

At step 808, the training processor may tune the phase of the transmit clock. For example, based upon determining an unstable read, the training processor may instruct a phase locked loop (PLL) at the transmit interface to shift the phase of the transmit clock. The training processor may instruct the respective components of the transmit interface to repeat the steps 802, 804, 806, 808 until the training processor detects a stable read. After detecting a stable read, the training processor may instruct the PLL to shift the phase of the transmit clock to and repeat the steps 802, 804, 806, 808 to determine a window of stable reads. Within the window of stable reads, the training processor may tune the phase of the transmit clock such that there is time lag between the core clock signal and the transmit clock signal. The training processor may set the time lag to account for hold and setup time of the transmit buffer. Additionally, the training processor may set the time lag to account for clock jitters and/or clock skews of the transmit clock and/or the core clock signal.

Figure 9:
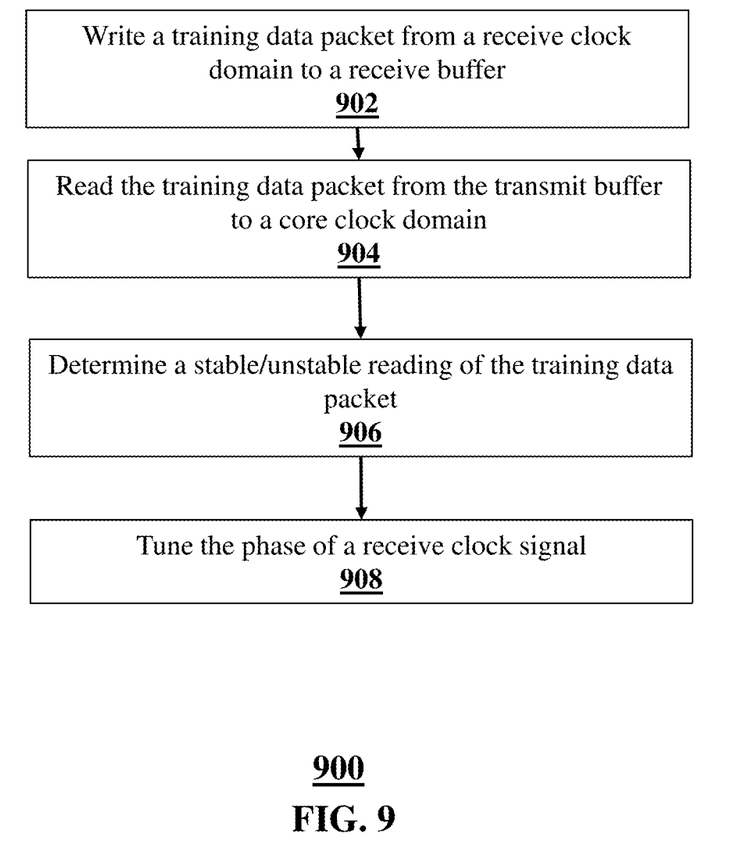
FIG. 9 shows a flow diagram of an illustrative method of tuning an interface clock of a receive interface in an ASIC of an emulation system, according to an embodiment.

FIG. 9 shows a flow diagram of an illustrative method 900 of tuning an interface clock of a receive interface in an ASIC of an emulation system, according to an embodiment. It should be understood that the steps of the method 900 are merely illustrative and additional/alternative steps should be considered within the scope of this disclosure. Furthermore, one or more steps of the method 900 may be skipped altogether.

The method 900 may begin at step 902 where circuit in the emulation system may write a training data packet from a receive clock domain to a receive buffer. The receive buffer may be a part of a SerDes receive interface.

At step 904, a read logic may read the training data packet from the receive buffer to a core clock domain. The read logic may be a part of the SerDes receive interface. For example, the read logic may be a portion of a physical media attachment macro in the SerDes receive interface.

At step 906, a training processor may determine a stable/unstable reading of the training data packet. For a stable reading of the training data packet, the training processor may receive an indication from the read logic that the entirety of the training data packet was read. The training processor may further receive an indication that valid error correcting bits were read by the read logic. For an unstable reading of the training data packet, the training processor may receive an indication that the entirety of the training data packet could not be read by the read logic. Additionally or alternatively, the training processor may receive an indication that a validity check based upon the error correcting bits failed.

At step 908, the training processor may tune the phase of the receive clock. For example, based upon determining an unstable read, the training processor may instruct a phase locked loop (PLL) at the receive interface to shift the phase of the receive clock. The training processor may instruct the respective components of the receive interface to repeat the steps 902, 904, 906, 908 until the training processor detects a stable read. After detecting a stable read, the training processor may instruct the PLL to shift the phase of the receive clock to and repeat the steps 902, 904, 906, 908 to determine a window of stable reads. Within the window of stable reads, the training processor may tune the phase of the receive clock such that there is time lag between the receive clock signal and the core clock signal. The training processor may set the time lag to account for hold and setup time of the receive buffer. Additionally, the training processor may set the time lag to account for clock jitters and/or clock skews of the receive clock and/or the core clock signal.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of tuning clock phases in a transmit interface of a chip in an emulation system, the method comprising:
    writing, with a core clock signal by a core component of the chip of a plurality of chips in the emulation system, a training data packet from a core clock domain associated with the core clock signal to a hardware buffer in the transmit interface of the chip;
    reading, with a transmit clock signal by a read logic in the transmit interface of the chip from the hardware buffer of the chip, the training data packet to a transmit clock domain associated with the transmit clock signal; and
    in response to a training processor determining an unstable reading of the training data packet:
        instructing, by the training processor, a clocking logic in the transmit interface to shift the phase of the transmit clock signal,
    wherein the training processor is external to the chip.

2. The method according to claim 1, further comprising:
    in response to the training processor determining a stable reading of the training data packet:
        determining, by the training processor, a window of a stable reading of the training data packet by instructing the clocking logic in the transmit interface to iteratively shift the phase of the transmit clock signal.

3. The method according to claim 2, further comprising:
    determining, by the training processor, the unstable or the stable reading of the training data packet based upon error correcting bits in the training data packet.

4. The method according to claim 2, further comprising:
    setting, by the training processor, a delay between the core clock signal and the transmit clock signal in the window of the stable reading of the training data packet.

5. The method according to claim 4, further comprising:
    setting, by the training processor, the delay between the core clock signal and the transmit clock signal based on a hold and setup time of the hardware buffer.

6. The method according to claim 4, further comprising:
    setting, by the training processor, the delay between the core clock signal and the transmit clock signal based on a clock jitter or a clock skew of at least one of the core clock signal and the transmit clock signal or based on a predicted margin of clock drift.

7. The method according to claim 1, wherein the chip is at least one of an emulation application specific integrated circuit or a switching application specific integrated circuit.

8. An emulation system comprising:
    a plurality of chips, a chip of the plurality of chips comprising:
        one or more interfaces having one or more hardware buffers and coupled to one or more parallel data lanes;
        a core component configured to write, with a core clock signal, a training data packet from a core clock domain associated with the core clock signal to a hardware buffer of the one or more hardware buffers in a transmit interface of the one or more interfaces;
        a read logic in the transmit interface configured to read, with a transmit clock signal, the training data packet from the hardware buffer to a transmit clock domain associated with the transmit clock signal; and
    a training processor configured to:
        instruct a clocking logic in the transmit interface to shift the phase of the transmit clock signal in response to the training processor determining an unstable reading of the training data packet,
    wherein the training processor is external to the chip.

9. The emulation system according to claim 8, wherein the training processor is further configured to:
    in response to the training processor determining a stable reading of the training data packet:
        determining a window of a stable reading of the training data packet by instructing the clocking logic in the transmit interface to iteratively shift the phase of the transmit clock.

10. The emulation system according to claim 9, wherein the training processor is further configured to:
    determine the unstable or the stable reading of the training data packet based upon error correcting bits in the training data packet.

11. The emulation system according to claim 9, wherein the training processor is further configured to:
   setting, by the training processor, a delay between the core clock signal and the transmit clock signal in the window of the stable reading of the training data packet.

12. The emulation system according to claim 11, wherein the training processor is further configured to:
   set the delay between the core clock signal and the transmit clock signal based on a hold and setup time of the hardware buffer.

13. The emulation system according to claim 11, wherein the training processor is further configured to:
   set the delay between the core clock signal and the transmit clock signal based on a clock jitter or a clock skew of at least one of the core clock signal and the transmit clock signal or based on a predicted margin of clock drift.

14. The emulation system according to claim 8, wherein the chip is at least one of an emulation application specific integrated circuit or a switching application specific integrated circuit.

15. A method of tuning clock phases in a receive interface of a chip in an emulation system, the method comprising:
   writing, with a receive clock signal by a circuit in the emulation system, a training data packet from a receive clock domain associated with the receive clock signal to a hardware buffer in a receive interface of a chip of a plurality of chips;
   reading, with a core clock signal by a read logic in the receive interface of the chip from the hardware buffer, the training data packet to a core clock domain associated with the core clock signal of a processing core of the chip; and
   in response to a training processor determining an unstable reading of the training data packet:
      instructing, by the training processor, a clocking logic in the receive interface of the chip to shift the phase of the receive clock signal,
   wherein the training processor is external to the chip.

16. The method according to claim 15, further comprising:
   in response to the training processor determining a stable reading of the training data packet:
      determining, by the training processor, a window of a stable reading of the training data packet by instructing the clocking logic in the receive interface to iteratively shift the phase of the receive clock signal.

17. The method according to claim 16, further comprising:
   determining, by the training processor, the unstable or the stable reading of the training data packet based upon error correcting bits in the training data packet.

18. The method according to claim 16, further comprising:
   setting, by the training processor, a delay between the receive clock signal and the core clock signal in the window of the stable reading of the training data packet.

19. The method according to claim 18, further comprising:
   setting, by the training processor, the delay between the receive clock signal and the core clock signal based on a hold and setup time of the hardware buffer.

20. The method according to claim 18, further comprising:
   setting, by the training processor, the delay between the receive clock signal and the core clock signal based on a clock jitter or a clock skew of at least one of the core clock signal and the receive clock signal or based on a predicted margin of clock drift.

* * * * *